United States Patent
Ellis et al.

(10) Patent No.: US 10,503,810 B2
(45) Date of Patent: Dec. 10, 2019

(54) FONT PERSONALIZATION

(71) Applicant: International Business Machines Corporation, Armonk, NY (US)

(72) Inventors: Richard R. Ellis, Bristol (GB); Matthew W. Leming, Romsey (GB); Geoffrey S. Pirie, Wiltshire (GB)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/742,873

(22) Filed: Jun. 18, 2015

(65) Prior Publication Data

US 2016/0371232 A1    Dec. 22, 2016

(51) Int. Cl.
*G06F 17/00* (2019.01)
*G06F 17/21* (2006.01)

(52) U.S. Cl.
CPC ................. *G06F 17/214* (2013.01)

(58) Field of Classification Search
CPC .............. G06F 17/214; G06F 17/211
See application file for complete search history.

(56) References Cited

U.S. PATENT DOCUMENTS

| | | | | |
|---|---|---|---|---|
| 5,664,086 A | * | 9/1997 | Brock | G06K 15/02 345/468 |
| 8,706,685 B1 | | 4/2014 | Smith et al. | |
| 2001/0026262 A1 | * | 10/2001 | Van Gestel | G06K 9/222 345/156 |
| 2006/0078203 A1 | * | 4/2006 | Loeb | G06F 17/214 382/187 |
| 2010/0231598 A1 | * | 9/2010 | Hernandez | G06F 17/214 345/471 |
| 2012/0001922 A1 | | 1/2012 | Escher et al. | |
| 2014/0036302 A1 | | 2/2014 | Goldberg et al. | |
| 2014/0344713 A1 | * | 11/2014 | Beglin | G06Q 10/107 715/752 |

FOREIGN PATENT DOCUMENTS

| | | |
|---|---|---|
| WO | 2010084207 A1 | 7/2010 |
| WO | 2014085910 A1 | 6/2014 |

OTHER PUBLICATIONS

Varlamis et al., "Increased Content Accessibility for Wiki and Blogs", AIS Electronic Library (AISeL), MCIS 2009 Proceedings, Paper 80, pp. 1-2, <http://aisel.aisnet.org/mcis2009/80>.

(Continued)

*Primary Examiner* — Andrew T McIntosh
(74) *Attorney, Agent, or Firm* — Robert D. Bean

(57) ABSTRACT

Method and system are provided for font personalization. The method carried out at a client includes: receiving a user-specific font transformation at a first client for storing at the first client, wherein the user-specific font transformation is a font transformation of a base font for an author user to which the font transformation applies; receiving content associated with the author user, wherein the content associated with the author user is received with an identifier of the user-specific font transformation of the author user; receiving the base font at the first client for storing at the first client for use with the user-specific font transformation; and applying the user-specific font transformation to the base font when rendering the content associated with the author user.

16 Claims, 14 Drawing Sheets

(56) References Cited

OTHER PUBLICATIONS

"Font Generator—Make Your Own Handwriting Font With Your Fonts", YourFonts, © 2008-2014 YourFonts, pp. 1-2, <http://www.yourfonts.com/>.

"Metafont", Wikipedia the free encyclopedia, Last modified on: Apr. 9, 2015, printed on: May 4, 2015, pp. 1-4, <http://en.wikipedia.org/wiki/Metafont>.

"Tag Archives: handwriting recognition—My Script Smart Note Solves Penultimate Users' Woes", MyScript, Published on: Dec. 5, 2014, pp. 1-3, <http://myscript.com/tag/handwriting-recognition/>.

\* cited by examiner

FONT PERSONALIZATION

BACKGROUND OF THE INVENTION

The present invention relates to font personalization, and more specifically, to font personalization using a communicated font transformation.

In this era of personalization and social media, the ability to stand out from a virtual crowd becomes increasingly difficult. Many of the social media tools provide multiple features to help us gather together information and share it with our colleagues. However, all content is represented using the same standard formats, such as fonts, which bring uniformity to the content but consequently make it harder to identify individuals and their contributions.

Typically, social media tools may include a graphic with the content, provided by the contributor and associated with their profile, as a means of tagging and assigning ownership or origin (e.g., a photo of the individual may be used for the graphic).

Handwriting is an often overlooked aspect of personalization through the transition from handwritten content to digital content. When receiving handwritten content (e.g., handwritten letters) from friends and family, the handwriting can often be instantly recognized. Most people would be able to identify the handwriting of family members and colleagues, and it becomes a subconscious effort to recognize a familiar author from their handwritten words.

SUMMARY

Embodiments of the present invention provide systems, methods, and program products for font personalization. In one embodiment of the present invention, a method is provided comprising: receiving, by one or more computer processors, a user-specific font transformation at a first client for storing at the first client, wherein the user-specific font transformation is a font transformation of a base font for an author user to which the font transformation applies; receiving, by one or more computer processors, content associated with the author user, wherein the content associated with the author user is received with an identifier of the user-specific font transformation of the author user; receiving, by one or more computer processors, the base font at the first client for storing at the first client for use with the user-specific font transformation; and applying, by one or more computer processors, the user-specific font transformation to the base font when rendering the content associated with the author user.

In another embodiment, one or more computer processors determine whether a local copy of the user-specific font transformation is available; responsive to determining that the local copy of the user specific font transformation is available, one or more computer processors receive the local copy of the user-specific font transformation; and responsive to determining that the local copy of the user specific font transformation is not available, one or more computer processors request the user-specific font transformation from a remote source.

In another embodiment, one or more computer processors determine whether a local copy of a required base font is available; responsive to determining that the local copy of the required base font is available, one or more computer processors receive the local copy of the required base font; and responsive to determining that the local copy of the required base font is not available, one or more computer processors request the required base font from a remote source.

In another embodiment, one or more computer processors receive a plurality of user-specific font transformations for a plurality author users at the first client; and one or more computer processors store the plurality of user-specific font transformations for the plurality author users at the first client, each of the plurality of user-specific font transformations is associated with an author user of the plurality of the author users.

In another embodiment, the font transformation of the base font includes at least one of: an equation modification to an equation of a vector font, a matrix transformation to a bitmap font, or a defined language transformation.

In another embodiment, the first client has a web browser in communication with a server, and the user-specific font transformation and the content associated with the author user are received from the server.

In another embodiment, the first client is in communication with a second client via a server, the user-specific font transformation is received by the server, and the content associated with the author user is received from the second client.

In another embodiment, the first client is in communication with a second client, and the user-specific font transformation and the content associated with the author user are received from the second client.

In another embodiment of the present invention, a method is provided comprising: defining, by one or more computer processors, a user-specific font transformation of a base font to apply to content associated with an author user; and sending, by one or more computer processors, the user-specific font transformation to a receiving client to locally store and apply to content associated with the author user received at the receiving client.

In another embodiment, one or more computer processors transmit content associated with the author user to the receiving client with an identifier of the user-specific font transformation of the base font.

In another embodiment of the present invention, a system is provided comprising: a font transformation receiving component configured to receive a user-specific font transformation at a first client for storing at the first client, wherein the user-specific font transformation is a font transformation of a base font for an author user to which the font transformation applies; a content receiving component configured to receive content associated with the author user, wherein the content associated with the author user is received with an identifier of the user-specific font transformation of the author user; a base font receiving component configured to receive the base font at the first client for storing at the first client for use with the user-specific font transformation; and a rasterizer configured to apply the user-specific font transformation to the base font when rendering the content associated with the author user.

In another embodiment, the system comprises a local cache checking component configured to: determine whether a local copy of the user-specific font transformation is available; responsive to determining that the local copy of the user specific font transformation is available, receive the local copy of the user-specific font transformation; and responsive to determining that the local copy of the user specific font transformation is not available, request the user-specific font transformation from a remote source.

In another embodiment, the system comprises a base font receiving component configured to: determine whether a local copy of a required base font is available; responsive to determining that the local copy of the required base font is available, receive the local copy of the required base font; and responsive to determining that the local copy of the required base font is not available, request the required base font from a remote source.

In another embodiment, the system comprises the first client has a web browser in communication with a server, the font transformation receiving component is configured to receive the user-specific font transformation and the content receiving component is configured to receive the content associated with the author user from the server.

In another embodiment, the system comprises the first client is in communication with a second client via a server, the font transformation receiving component is configured to receive the user-specific font transformation from the server, and the content receiving component is configured to receive the content associated with the author user from the second client.

In another embodiment, the system comprises the first client is in communication with a second client, the font transformation receiving component is configured to receive the user-specific font transformation and the content receiving component is configured to receive the content associated with the author user from the second client.

In another embodiment of the present invention, a system is provided comprising: a font transformation defining component configured to define a user-specific font transformation of a base font to apply to content associated with an author user; and a font transformation sending component configured to send the user-specific font transformation to a receiving client to locally store and apply to content associated with the author user received at the receiving client.

In another embodiment, the system comprises a content transmitting component configured to transmit content associated with the author user to the receiving client with an identifier of the user-specific font transformation of the base font.

In another embodiment of the present invention, a computer program product is provided comprising: one or more computer readable storage media and program instructions stored on the one or more computer readable storage media, the program instructions comprising: program instructions to receive a user-specific font transformation at a first client for storing at the first client, wherein the user-specific font transformation is a font transformation of a base font for an author user to which the font transformation applies; program instructions to receive content associated with the author user, wherein the content associated with the author user is received with an identifier of the user-specific font transformation of the author user; program instructions to receive the base font at the first client for storing at the first client for use with the user-specific font transformation; and program instructions to apply the user-specific font transformation to the base font when rendering the content associated with the author user.

In another embodiment, the program instructions stored on the one or more computer readable storage media further comprise: program instructions to determine whether a local copy of the user-specific font transformation is available; program instructions to, responsive to determining that the local copy of the user specific font transformation is available, receive the local copy of the user-specific font transformation; and program instructions to, responsive to determining that the local copy of the user specific font transformation is not available, request the user-specific font transformation from a remote source.

Embodiments of the present invention provide systems, methods, and program products that provide an advantage, such as providing an opportunity to customize the appearance of digital content on-screen, and thus appeal to users of the digital content whom invest a large amount of time in existing personalization capabilities. Embodiments of the present invention may also provide another advantage, such as allowing a reader of digital content to identify the form and pattern of letters to recognize an author of the digital content. In this instance, the provided advantage is particularly helpful. For example, a user of a service providing digital content, may scan multiple comments in a long blog post. In this instance, the reader (i.e., the user) is enabled to quickly identify contributions from a specific author, and when the user is familiar with a personalized font style of a specific author, then the user may automatically attribute authorship to the specific author.

Embodiments of the present invention provide systems, methods, and program products that provide yet another advantage, such as reducing an amount of data transmitted required to present a personalized font in digital content to a user, compared to sending an entire font to the user, as only transmission of the font transformation data is required.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in FIGS. 1-11 have not necessarily been drawn to scale. For example, the dimensions of some of the elements may be exaggerated relative to other elements for clarity. Further, where considered appropriate, reference numbers may be repeated among FIGS. 1-11 to indicate corresponding or analogous features.

DETAILED DESCRIPTION

Embodiments of the present invention provide systems and methods for creating a personalized font from a base font enabling the personalization of the font to be transmitted with digital content. Embodiments of the present invention provide systems and methods for generating a unique font, similar to that of handwriting, and in a manner that allows for the personalization to be readily associated with digital content, without having to create an entire font for each individual.

A font transformation is independent of a base font, and can be stored and transmitted independently. When the font transformation is available, a rasterizer can use the font transformation to create a customized font by applying the font transformation to the base font data. Storing and transmitting the font transformation allows for a reduction in the amount of data that is sent, as only the font transformation data is required to be stored and transmitted.

Figure 1:
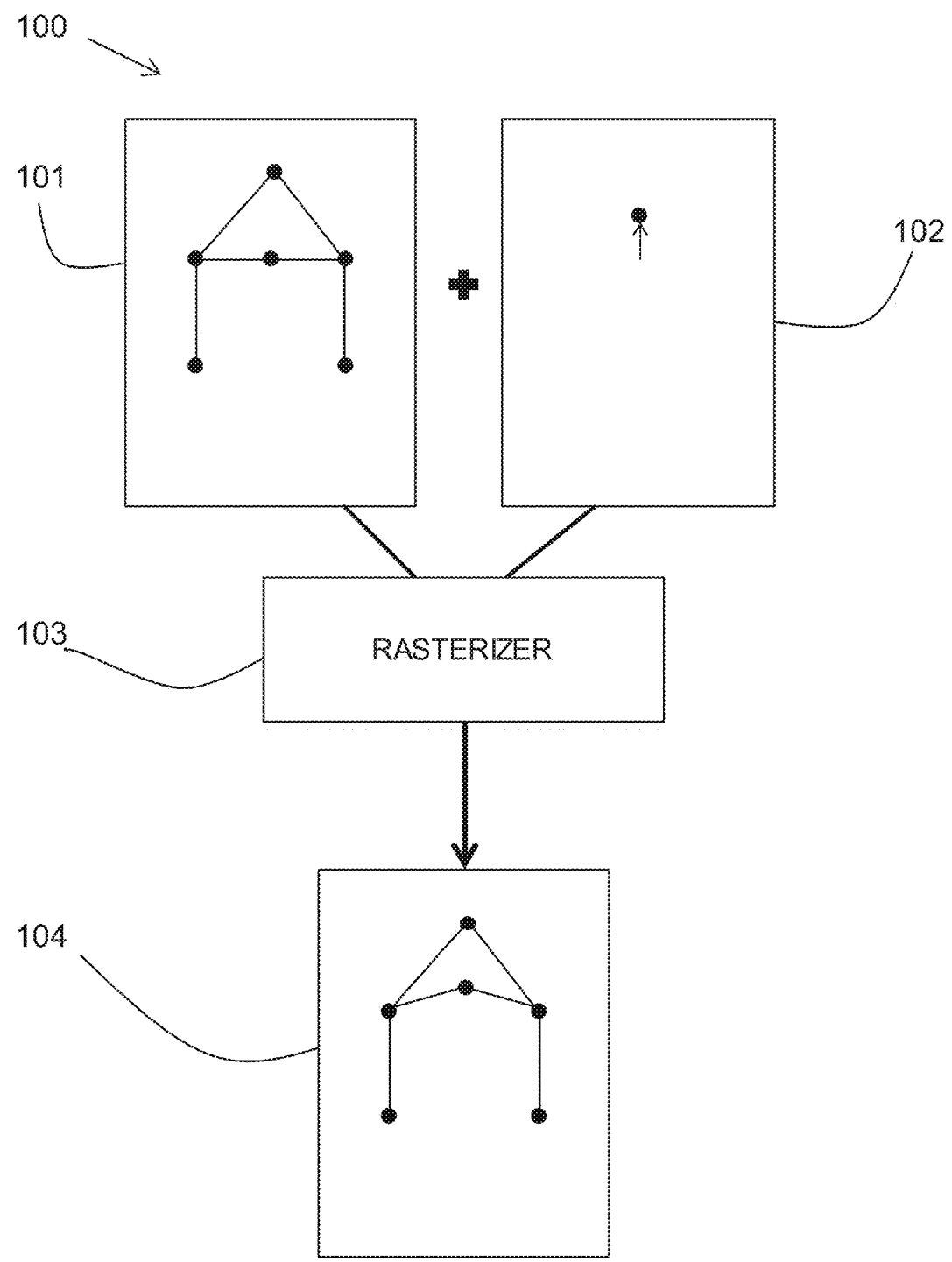
FIG. 1 is a schematic diagram of an embodiment of an aspect of a method, in accordance an embodiment of the present invention.

FIG. 1 is schematic diagram 100 of an embodiment of an aspect of a method, in accordance with an embodiment of the present invention. In this embodiment, schematic diagram 100 shows base font 101 to which font transformation 102 is applied by rasterizer 103 resulting in customized font 104.

Using a coordinate based vector system of representation, a font can be described by a set of points for a given alpha-numeric character. Furthermore, a customized font, tailored to an individual, can be represented as a transformation (e.g., font transformation 102) to one or more of the points for any given character. By capturing the transformation and storing it independently of the base font (e.g., base font 101), the transformation can be transmitted independently of the base font.

Capturing and storing the base font (e.g., base font 101) and the transformation (e.g., font transformation 102) independently enables digital content to be "tagged" with a reference to the transformation. For example, when the digital content is presented to a user, the font of the digital content is customized by applying the user-specific transformation to the base font of the digital content.

The implementation of a base font (e.g., base font 101) and its transformation (e.g., font transformation 102), may make use of existing font technologies, such as Knuth's meta-font. In an instance that utilizes a base meta-font, the transformation would be a modification to the equation of the base meta-font. Other approaches to describing a font could equally be implemented. Embodiments of the present invention can also be applied to non-vector based fonts.

Figure 2A:
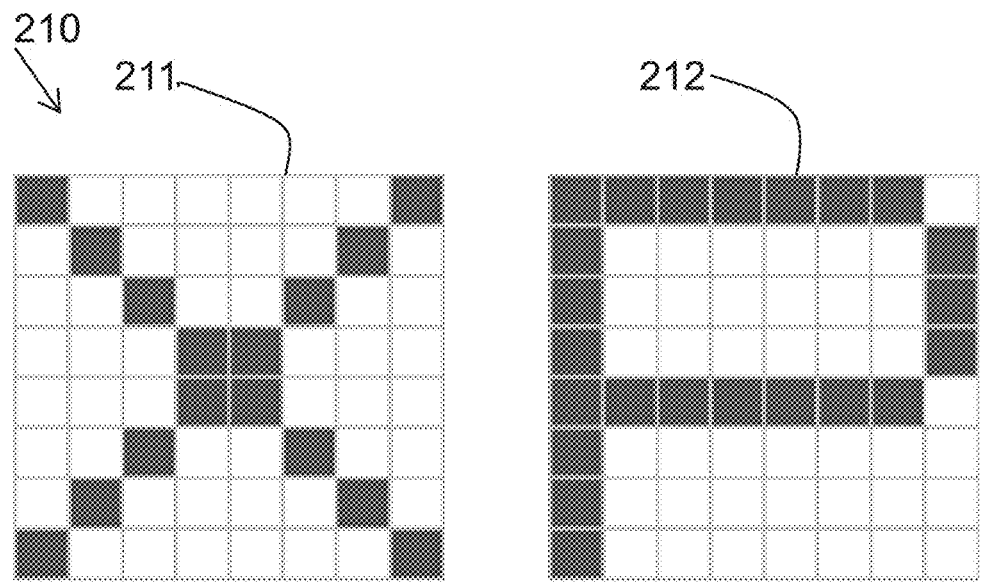
FIGS. 2A and 2B are schematic diagrams of an embodiment of an aspect of a method, in accordance an embodiment of the present invention.
Figure 2B:
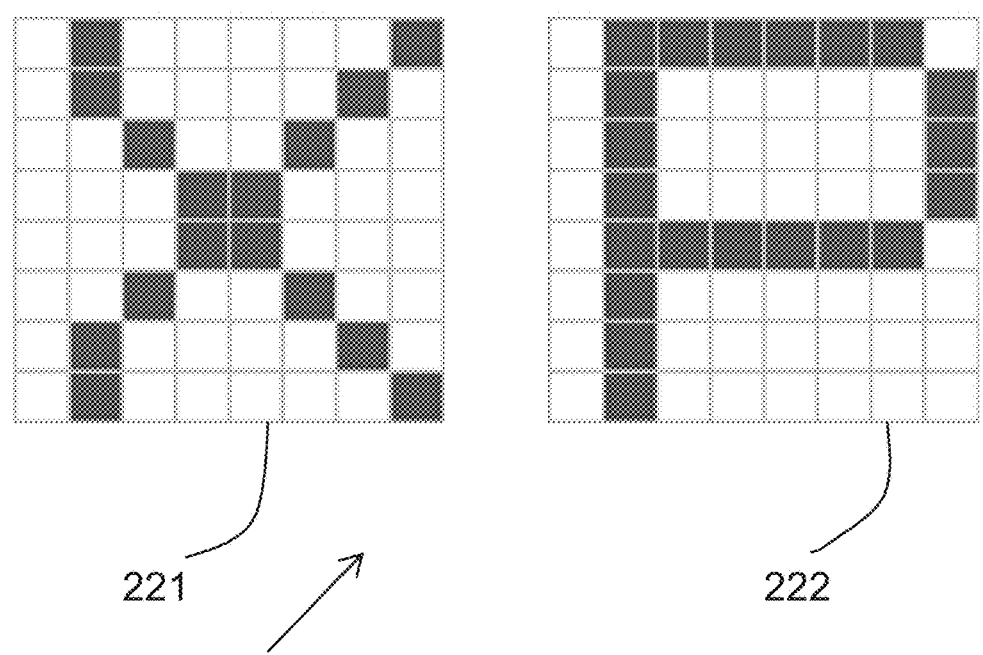

FIGS. 2A and 2B are schematic diagrams 210 and 220 of an embodiment of an aspect of a method, in accordance an embodiment of the present invention. In this embodiment, FIGS. 2A and 2B show bitmap images of "X" (e.g., letter 211 and letter 221), as well as, "P" (e.g., letter 212 and letter 222).

In FIG. 2A, the base font (e.g., base font 101) bitmap images are represented by letter 211 and letter 212. A transformation (e.g., font transformation 102) may be applied, specifying, "move any pixels in column 1 to column 2", resulting in the bitmap images shown in FIG. 2B (e.g., letter 221 and letter 222). In another embodiment, these font forms can be represented by a matrix. Furthermore, the transformations may involve applying matrix transformations to these font forms or, optionally, only to a portion of the base font. In yet another embodiment, a language may be defined to describe these transformations, similar to that of the meta-font example as previously discussed with regard to FIG. 1.

A transformation (e.g., font transformation 102) may be applied to more than one font. For example, some letters share common characteristics (e.g., P, K, and L all have a vertical left stroke). If a method to encode and transform the font allows "common traits" to be modified, then in the previous example, the vertical stroke can have a general transform which would apply to all three letters (e.g., P, K, and L). The degree of application would vary based on the specific implementation.

A transformation (e.g., font transformation 102) may also include applying a color user-specific font color to further distinguish the customized font. Since the transformation operates on a character by character basis, each character may have a "color transformation" creating a "rainbow" colored string of characters (i.e., each character in the string of characters has a unique color transformation that has been applied).

Embodiments of the present invention recognize that, in the era of high definition displays, there is great scope for subtle variations in font form. The customization of fonts therefore has greater potential than when display technology did not have the same high resolution capabilities of present day devices.

Figure 3:
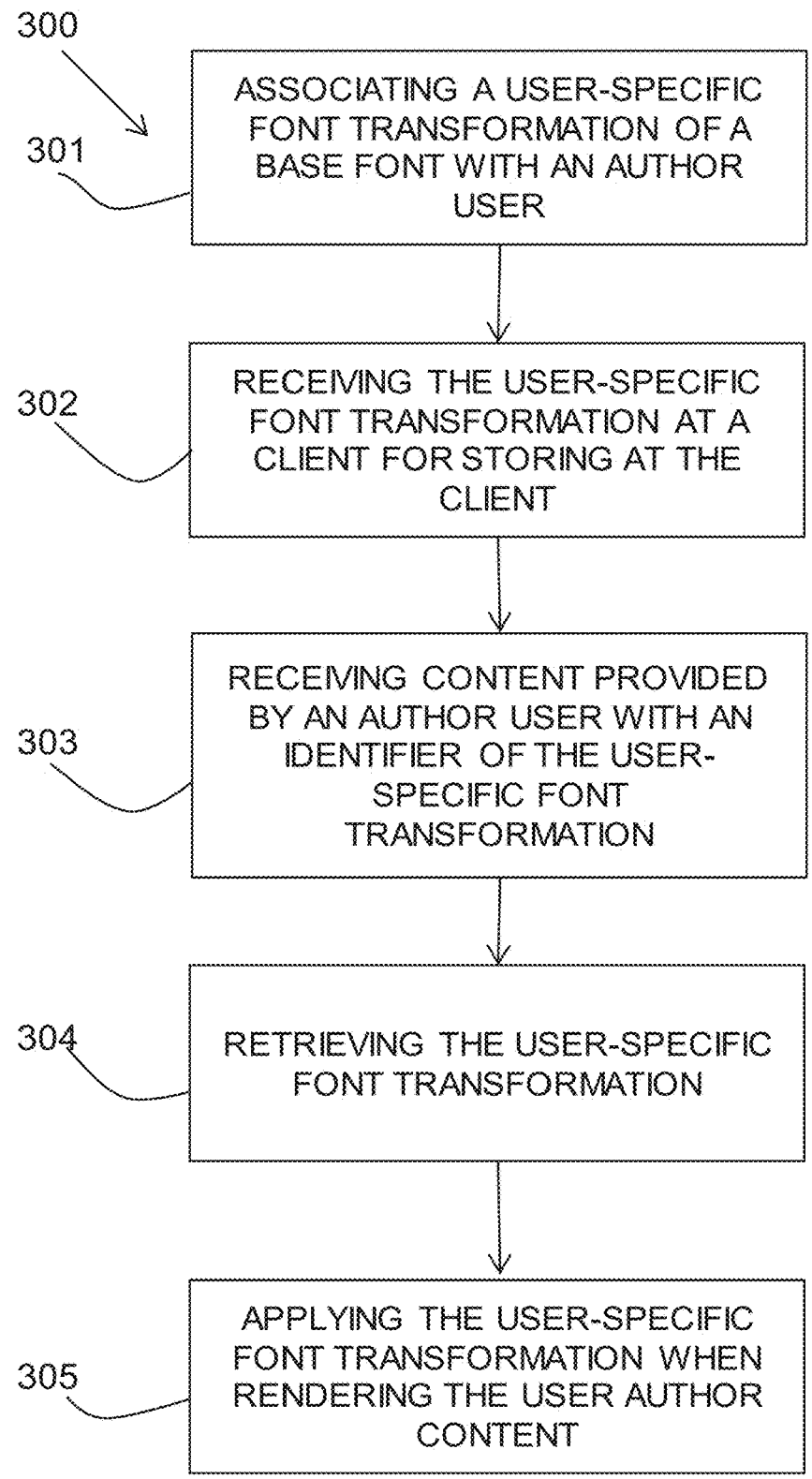
FIG. 3 is a flow diagram of an example embodiment of a method, in accordance an embodiment of the present invention.

FIG. 3 is a flowchart 300 of an example embodiment of a method, in accordance an embodiment of the present invention. In this embodiment, the method of font personalization is carried out by a server or other device providing user digital content. Various embodiments of systems in which this method may be implemented and are described further below.

In step 301, a user-specific font transformation (e.g., font transformation 102) of a base font (e.g., base font 101) is associated with an author user. In step 302, the user-specific font transformation may be received and stored at a client. In step 303, content associated with the author user (e.g., content provided by or attributed to the author user) may be received with an identifier of the user-specific font transformation. In step 304, the client may retrieve the user-specific font transformation. In step 305, the client applies the user specific font transformation to a base font when rendering the user content.

In certain embodiments, each user of a plurality of users may have a font transformation (e.g., font transformation 102) associated with their profile. They do not need to all use the same base font (e.g., base font 101). In general, a font transformation is likely to be associated with a specific base font. Implementing different base fonts minimizes an amount of customization required to achieve a personal style. For example, a flamboyant base font might be chosen by someone who wants to have a lively visual style, without having to make a large number of customizations to the base font. In another example, a simple and clean font might be chosen by someone who wants to have a clean and easy to read font, yet still have customizations that do not deviate too far from the base font. In an embodiment, a font transformation can be applicable to a variety of base fonts if there are base fonts that share common traits and the font transformation describes modifications of these traits.

In one embodiment, digital content may be tagged with a reference to a user-specific font transformation (e.g., font transformation 102) and the user-specific font transformation may be applied when rendering the digital content.

Figure 4A:
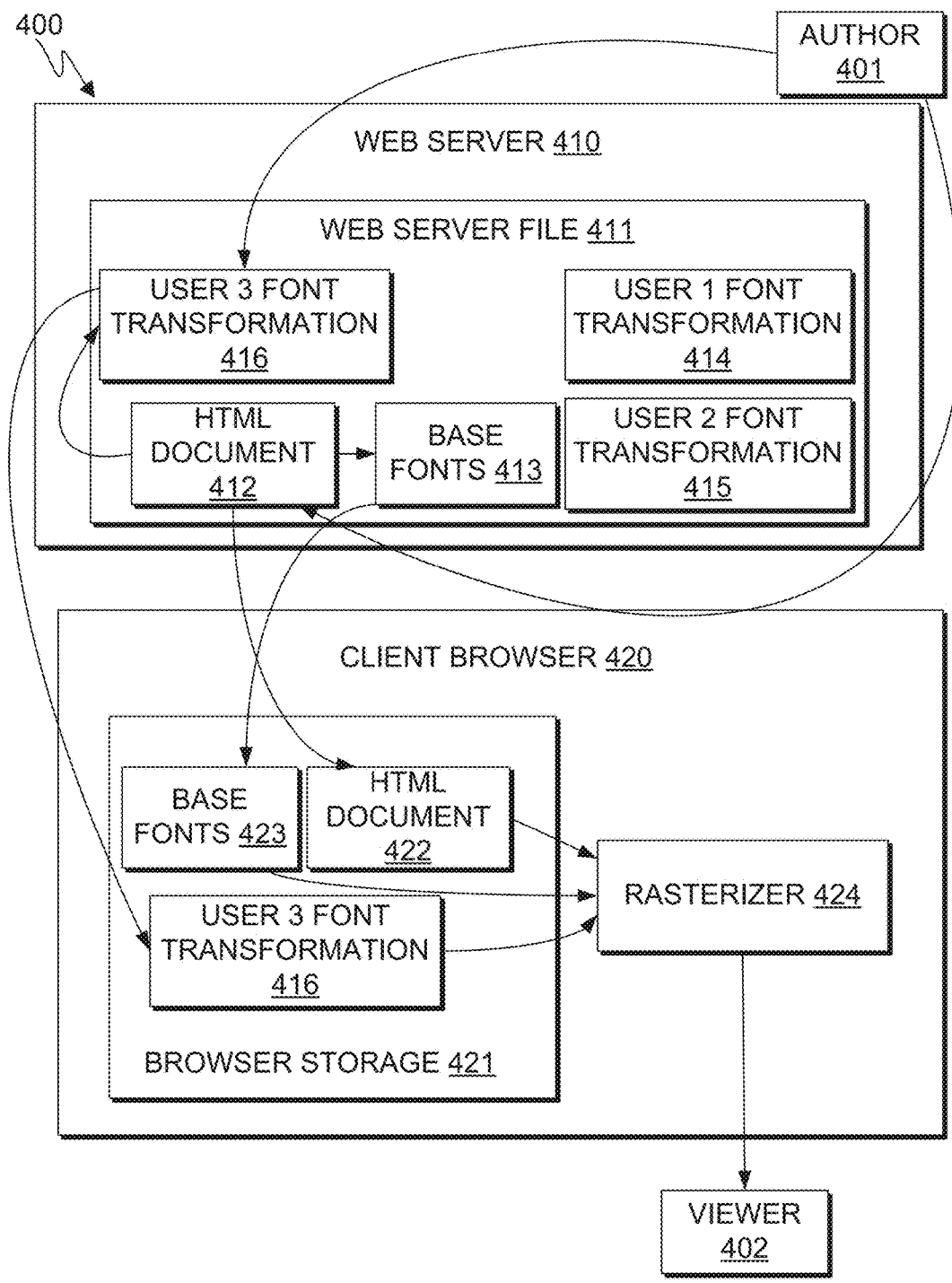
FIG. 4A is a block diagram of a first embodiment of a web server system, in accordance an embodiment of the present invention.

FIG. 4A is a block diagram of a first embodiment of web server system 400, in accordance an embodiment of the present invention. In this embodiment, web server system 400 includes web server 410 and client browser 420 of viewer 402. Author 401 (i.e., an author user) of web content may be a user of another client browser (not shown).

Web server 410 may include web server file system 411 in which content hosted by web server 410. The content may be in the form of hypertext markup language (HTML) documents 412. HTML documents 412 may reference stored base fonts 413 and user 1 font transformation 414, user 2 font transformation 415, and user 3 font transformation 415 for different authors 401 of the content.

Author 401, as part of their registration process for publishing content, creates a font transformation (e.g., user 1 font transformation 414) that is associated with their user profile. User 1 font transformation 414 is stored on web server 410 in web server file system 411. Other authors 401 may also create other font transformations (e.g., user 2 font transformation 415 and user 3 font transformation 416). Whenever a particular author 401 creates content, a font transformation is associated with the content they create.

Viewer 402 directs client browser 420 to content hosted by web server 410 and retrieves HTML document 412 from web server 410. HTML document 412 contains references to the resources used by HTML document 412, such as, a reference to base fonts 413 and user 1 font transformation 414.

If client browser 420 does not already have a cached copy of one or more base fonts 423 and user 3 font transformation 416, then client browser 420 requests a copy from web server 410. Embodiments of the present invention implement a process for downloading an embedded image, such as issuing an HTTP GET for a named resource. Base fonts 423 and user 3 font transformation 416 are then stored in browser storage 421 (e.g., a browser cache).

Client browser 420 may render the retrieved page content 422. During this process, rasterizer 424 at client browser 420 applies user 3 font transformation 416 to one or more base fonts 423 so that client browser 420 can render content created by author 401 using their personalized font form.

A user may update user 3 font transformation 416 by storing a new version of user 3 font transformation 416 on web server 410. When client browser 420 requests the resource, the latest version is sent by web server 410 to client browser 420.

Figure 4B:
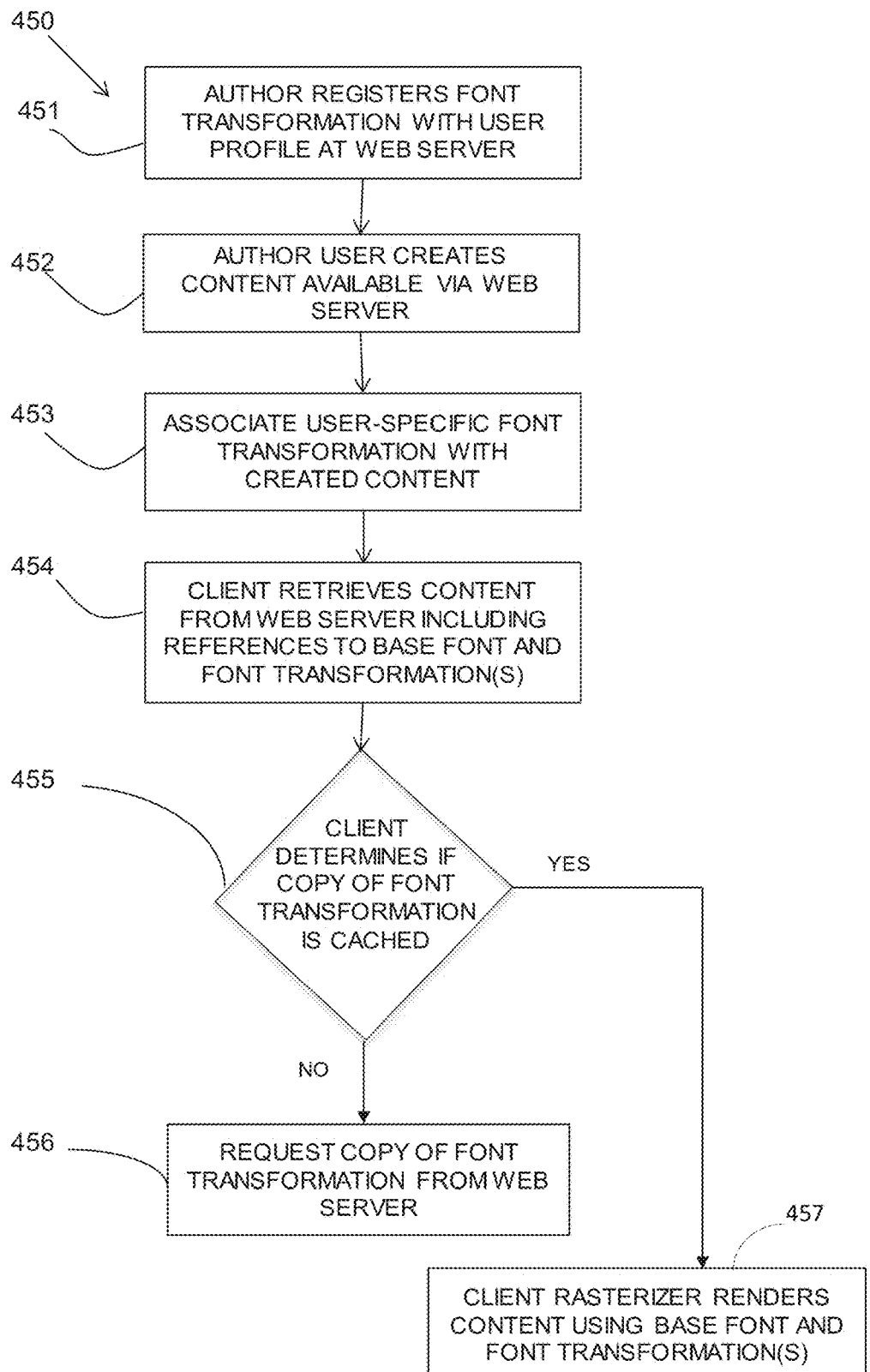
FIG. 4B is a flow diagram of a method using the system of FIG. 4A, in accordance an embodiment of the present invention.

FIG. 4B is a flowchart 450 illustrating operational steps for a method for the system in FIG. 4A, in accordance with an embodiment of the present invention.

In step 451, an author user may register a unique font transformation (e.g., user 1 font transformation 414, user 2 font transformation 415, and/or user 3 font transformation 416) associated with the user's profile at web server 410.

In step 452, the author may create content available via web server 410 and a base font (e.g., one of base fonts 413). Furthermore, in step 453, a unique font transformation (e.g., user 1 font transformation 414, user 2 font transformation 415, and/or user 3 font transformation 416) may be associated with the created content by use of a tag or a reference. Content may include references to font transformations of different users.

In step 454, viewer 402 using client browser 420 may retrieve content from web server 410 including the references to the base font (e.g., one of base font 413) and font transformations (e.g., user 1 font transformation 414, user 2 font transformation 415, and/or user 3 font transformation 416) of authors 401 of the content.

In step 455, client browser 420 may determine if client browser 420 already has a cached copy of the base font (e.g., one of base fonts 413) and font transformations (e.g., user 1 font transformation 414, user 2 font transformation 415, and/or user 3 font transformation 416). If client browser 420 does not have a cached copy of the base font, then in step 456, client browser 420 may request one or more copies of the base font from web server 410. The requested copies may be stored at browser storage 421 for this use and future uses.

In step 457, rasterizer 424 may then render the content. Furthermore, in step 457, rasterizer 424 applies the referenced font transformations to the base font (e.g., one of base fonts 423) thereby rendering the different user's content in personalized fonts.

One example involves rendering content in HTML. The following example is an HTML extract that demonstrates how the HTML markup can be used to indicate the specific transformation to apply. In this example, imagine the web page is a social media site and is displaying the content of two different users, one user called "Matt" and another user called "Geoff".

```
<html>
<style>
    @font-face {
      font-family: myPlasticFont;
      src: url("reference-to-base-plasticFont");
    }
    div {
      font-family: myPlasticFont;
    }
</style>
<body>
    <div font-transform:"reference-to-Geoff-transform">Fishing</div>
    <div font-transform:"reference-to-Matt-transform">Running</div>
</body>
</html>
```

Within this HTML document the "<style>" section defines the default style for a "<div>," and defines a base font (e.g., base font 101) called PlasticFont. The PlasticFont is defined as a font-face, which identifies the source location of the font resource where the base font can be loaded from. Furthermore, this font-face (i.e., PlasticFont) is assigned to all "<div>" tags.

In the body of the web page based on the HTML document, and more particularly where the actual user content is contained, the "<div>" tags have an added font-transform attribute enabling users and/or authors to indicate which specific transformation to apply to each part of the content.

The "<body>" section includes two "<div>" sections, each of which specifies a font transform to be applied to the "<div>" sections.

The "font-transform" attribute is illustrative and demonstrates a manner in which the transformation could be associated with the user's content. In certain embodiments, the font-transform may be omitted from the "<div>" tag. In this instance, the browser may still render the content using the unmodified base font.

The combination of rasterizer 424 and standard HTML practices of referencing common data, fonts, and caching these elements, enables the browser to download the font transformation (e.g., user 1 font transformation 414, user 2 font transformation 415, and/or user 3 font transformation 416) and apply it to any instance of the base font (e.g., one of base fonts 423) that is tagged to (i.e., associated with) the user. Embodiments of the present invention implement a process for tagging the document content, such as inserting a reference to a profile picture. In another embodiment, a social media tool may be used, wherein the font transformation data would be associated with the profile of an individual user, just as a photo is attached to a profile.

Figure 5A:
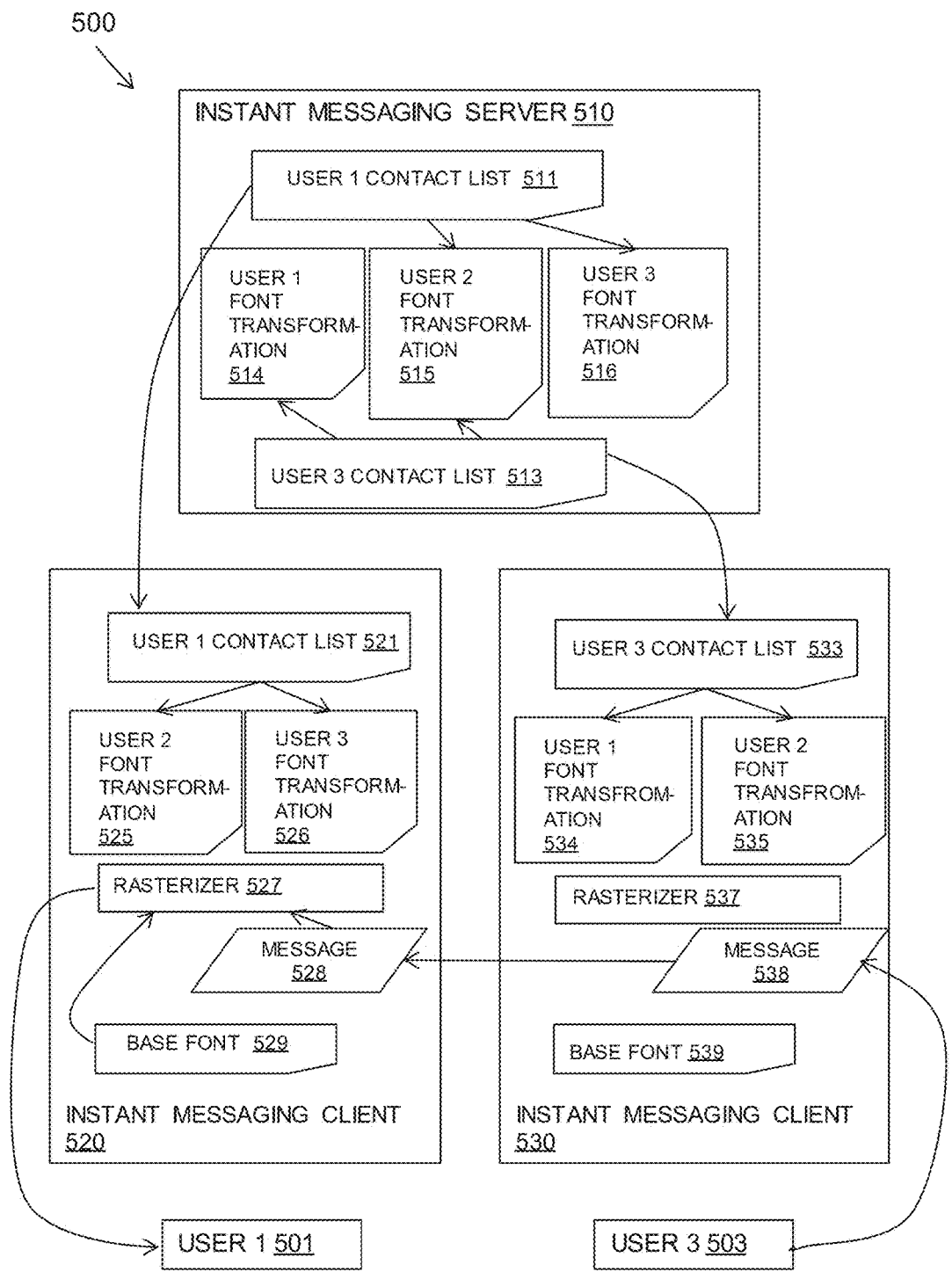
FIG. 5A is a block diagram of a second embodiment of a system, in accordance an embodiment of the present invention.

FIG. 5A shows an instant messaging system 500, in accordance with an embodiment of the present invention. In this embodiment, instant messaging system 500 includes an instant messaging server 510 and two instant messaging clients 520, 530 of a first user, user 1 501 and a second user, user 3 503.

User 1 501 and user 3 503 log in to an instant messaging service. Part of the login process involves retrieving user 1 contact list 511 and user 3 contact list 513 from instant messaging server 510, and stores user 1 contact list 521 and user 3 contact list 533 in instant messaging clients 520 and 530. In certain embodiments, user 1 font transformation 514, user 2 font transformation 515, and/or user 3 font transformation 516 may be stored on instant messaging server 510. When user 1 contact list 511 is downloaded at instant messaging client 520 by user 1 501, the associated font transformations (i.e., user 2 font transformation 525, user 3 font transformation 526, etc.) for all users in the contact list 521 of user 1 501 are also downloaded to instant messaging client 520.

User 3 503 may send message 538 to user 1 501 which receives message 528. The peer-to-peer connection between instant messaging clients 520 and 530 allows instant messaging clients 520 and 530 to identify users communicating with one another. Furthermore, instant messaging clients 520 and 530 may associate the correct font transformation (e.g., user 2 font transformation 525, user 3 font transformation 526, user 2 font transformation 535, etc.) to use for the conversation. For example, user 1 501 may use user 3 font transformation 526 downloaded for user 3 503 for received messages 528 from user 3 503. User 3 503 will use user 1 font transformation 534 downloaded for user 1 501 for received messages 538 from user 1 501.

When instant messaging client 520 and/or 530 displays messages 528 and/or 538, rasterizers 527 and/or 537 applies the font transformation (e.g., user 2 font transformation 525, user 3 font transformation 526, etc.) to a base font (e.g., base font 529 and/or base font 539).

User 1 501 and user 3 503 can update their font transformation (e.g., user 2 font transformation 525, user 3 font transformation 526, etc.) using instant messaging clients 520 and 530. One or more adjustments to the transformation may result in uploading the updated transformation and transformation data to instant messaging server 510. Furthermore, updating When user 1 501 or user 3 503 connects to instant messaging server 510 to download user 1 contact list 521 and/or user 3 contact list 533. Furthermore, instant messaging server 510 may also notify instant messaging client 520 and/or instant messaging client 530 of new versions of font transformations available for download.

Figure 5B:
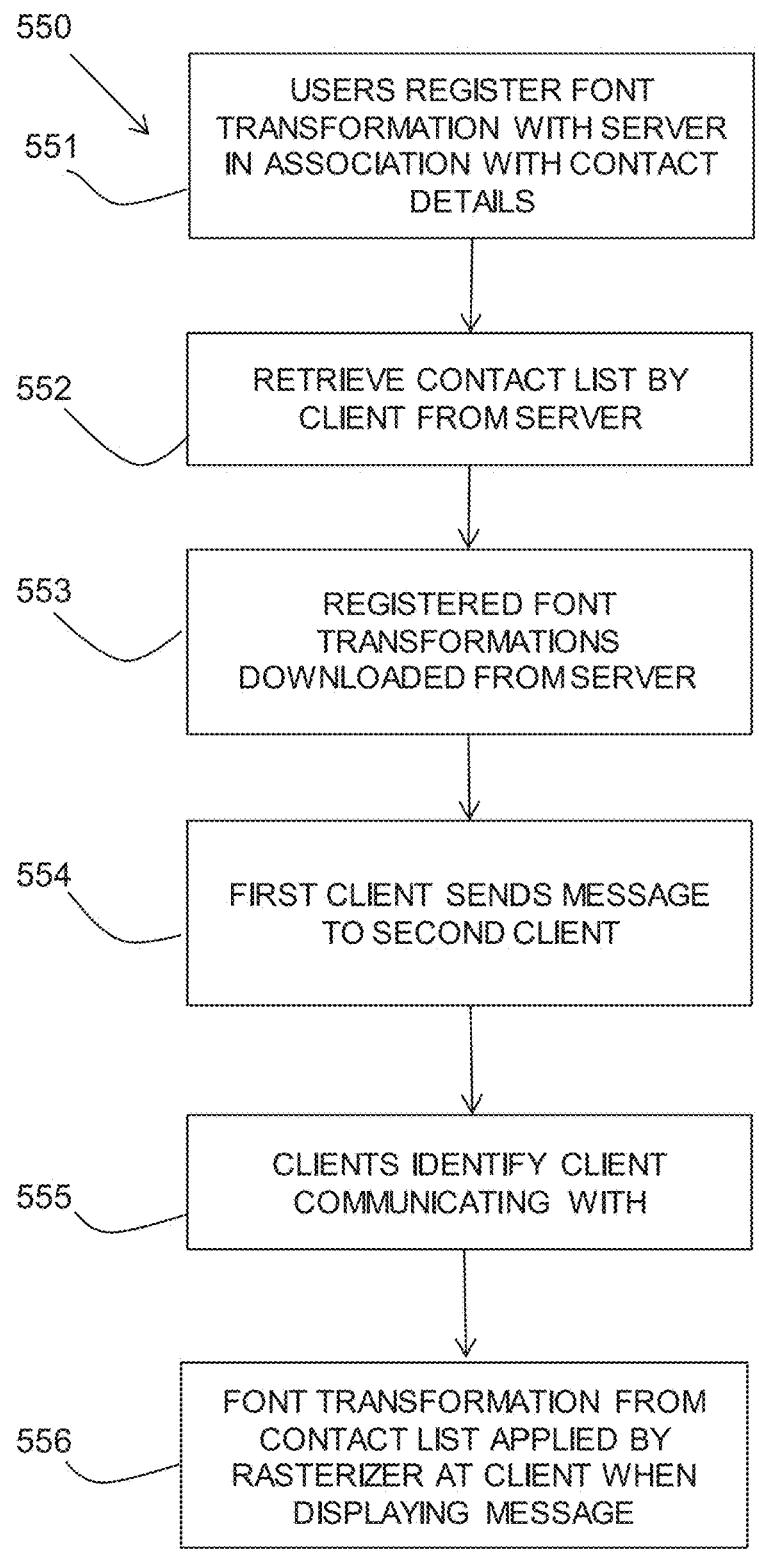
FIG. 5B is a flow diagram of a method using the system of FIG. 5A, in accordance an embodiment of the present invention.

FIG. 5B is a flowchart 550 illustrating operational steps for a method for the system in FIG. 5A, in accordance with an embodiment of the present invention.

In step 551, one or more users (e.g., user 1 501 and user 3 503) using instant messaging system 500 may register a font transformation (e.g., user 2 font transformation 525, user 3 font transformation 526, etc.) with instant messaging server 510. Furthermore, the registered font transformation can be associated with one or more contacts included in user 1 contact list 521 and user 3 contact list 533.

In step 552, the one or more users (e.g., user 1 501 and user 3 503) may log in and user 1 contact list 521 and/or user 3 contact list 533 may be retrieved from instant messaging server 510. Furthermore, in step 553, each contact included in user 1 contact list 521 and user 3 contact list 533 may optionally have a registered font transformation (e.g., user 2 font transformation 525, user 3 font transformation 526, etc.). Furthermore, the registered font transformation may be downloaded from instant messaging server 510.

In step 554, instant messaging client 530 sends message 538 to instant messaging client 520. Furthermore, in step 555, the peer-to-peer connection allows instant messaging client 530 and instant messaging client 520 to identify users that are communicating.

In step 556, a correct font transformation (e.g., user 2 font transformation 525, user 3 font transformation 526, etc.) for instant messaging client 530 is determined. In one embodiment, the correct font transformation may be determined at instant messaging client 520 and the font transformations of the instant messaging client 530 are applied to a base font (e.g., base font 529 and/or base font 539) by a rasterizer (e.g., rasterizer 527 and/or rasterizer 537) at instant messaging client 520. In another embodiment, push methods can be used to "push" the transform along with the message to the intended recipient.

Figure 6A:
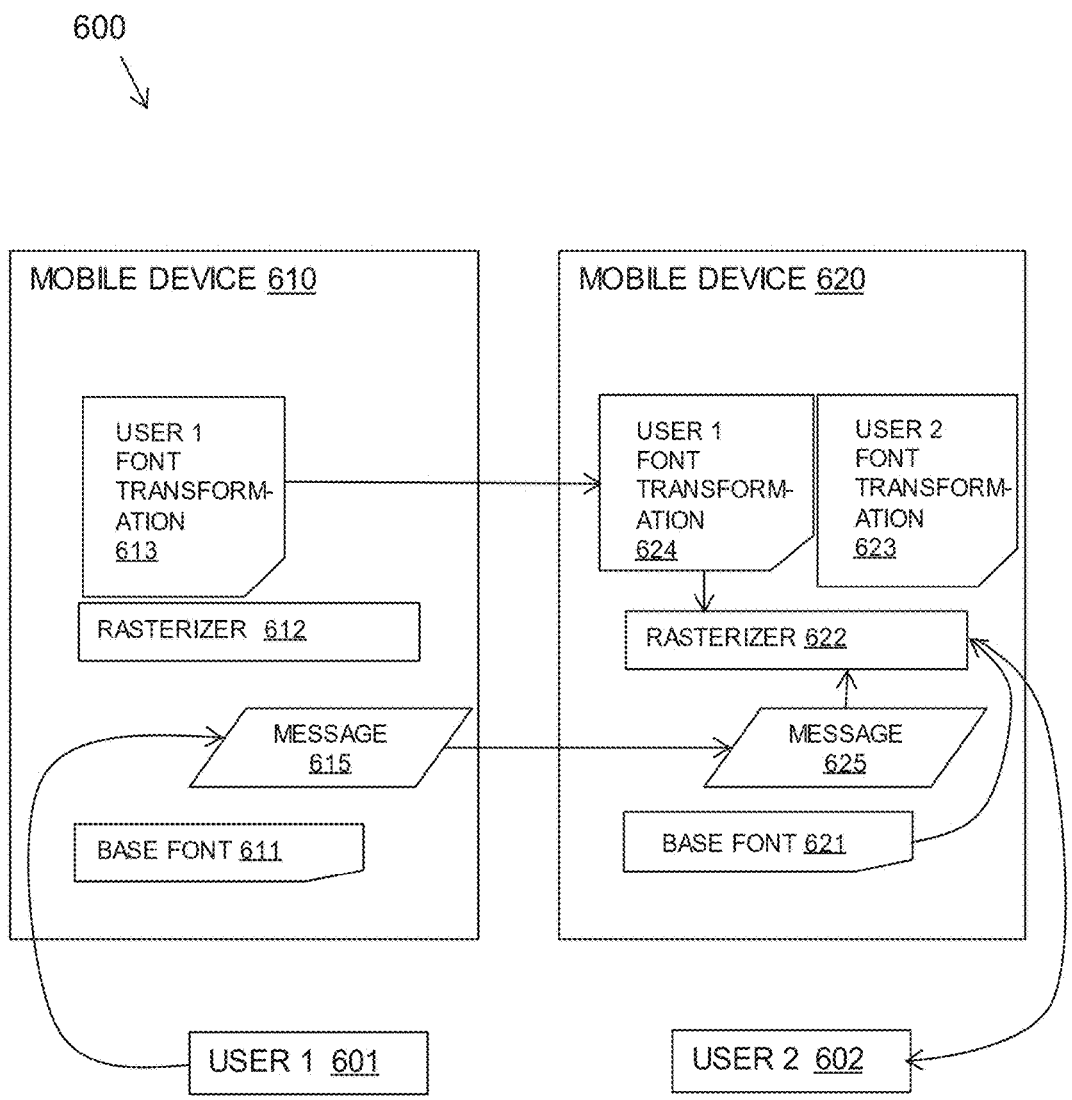
FIG. 6A is a block diagram of a third embodiment of a system, in accordance an embodiment of the present invention.

FIG. 6A is a block diagram of a third embodiment of a system in accordance with the present invention. In this embodiment, mobile communication device environment 600 illustrates an interaction between a first mobile device 610 of user 1 601 and a second mobile device 620 of user 3 602. Each of mobile devices 610 and 620 includes a stored base font (e.g., base font 611, base font 621, etc.) and a rasterizer (e.g., rasterizer 612, rasterizer 622, etc.). Each of mobile devices 610 and 620 may store one or more user font transformations (e.g., user 1 font transformation 613, user 2 font transformation 623, etc.) for a user (i.e., user 1 601 and/or user 2 602) interacting with one of mobile devices 610 or 620. Furthermore, each of mobile devices 610 and 620 may receive and store font transformations 624 for other users.

User 1 601 initiates a conversation with user 2 602 in order to send a message (e.g., message 615). Furthermore, user 2 602 requests the font transformation (e.g., user 1 font transformation 613) from user 1 601. The existence of the font transformation can either be part of the meta-data surrounding the message, or could have been communicated to user 2 602 as part of the initial connection process. If user 2 602 already has a local cached version of font transformation 624, then retrieving font transformation from user 1 601 may not be required.

When message 625 is displayed to user 2 602, rasterizer 622 of mobile device 620 applies the font transformation (e.g., user 1 font transformation 624) to base font 621. A master copy of the font transformation for a user is stored on mobile device 610. If user 1 601 modifies the font transformation, then a next time a conversation (i.e., interaction) is initiated with a contact, the latest version of the font transformation is made available.

Figure 6B:
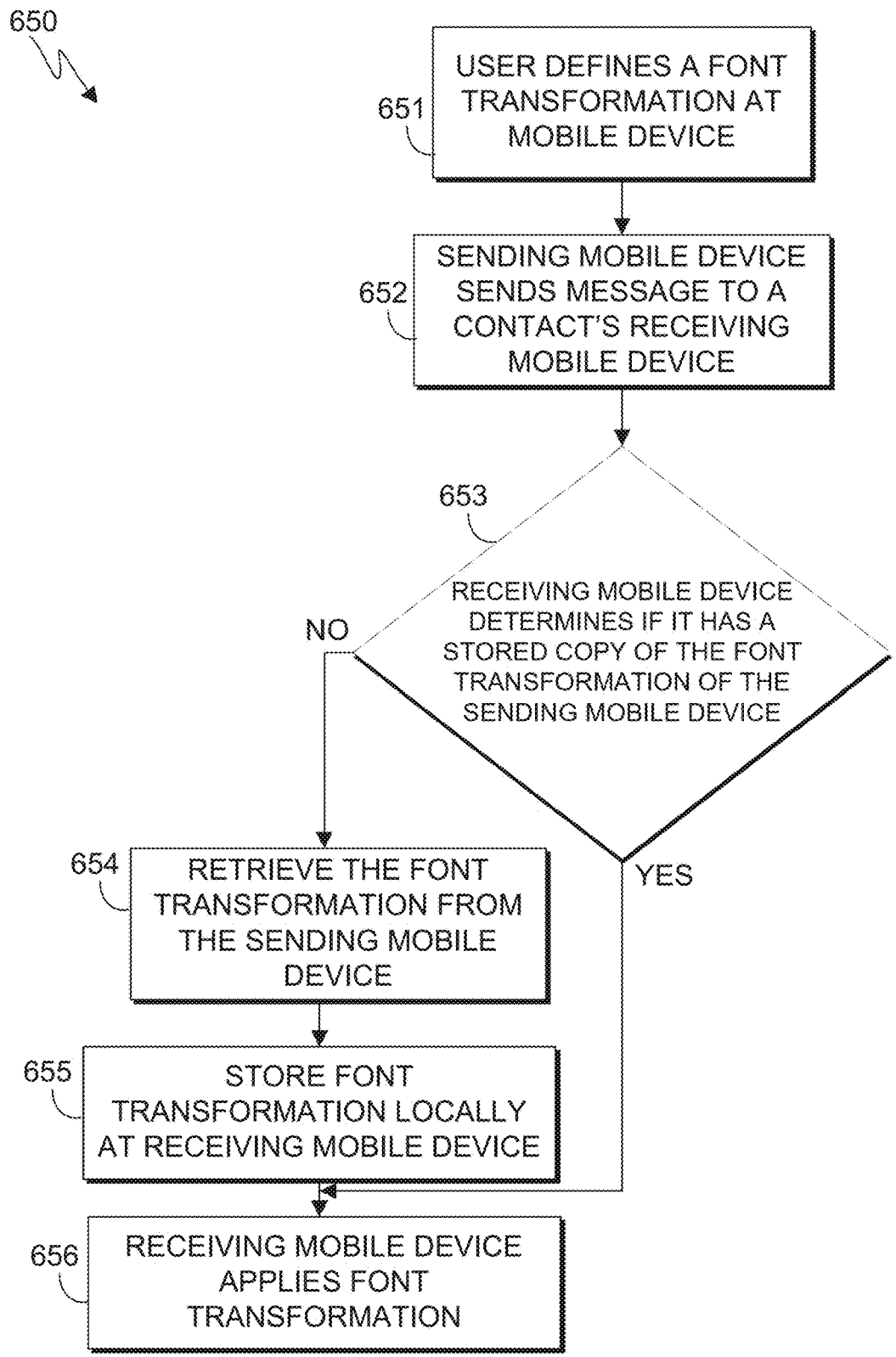
FIG. 6B is a flow diagram of a method using the system of FIG. 6A, in accordance an embodiment of the present invention.

FIG. 6B is a flow diagram 650 of a method using the system of FIG. 6A. In step 651, a user (i.e., user 1 601 and/or user 2 602) defines font transformation (e.g., user 1 font transformation 613, user 2 font transformation 624, and/or user 2 font transformation 623) at mobile devices 610 and/or 620. In step 652, the user may send message 615 to a contact. Furthermore, in step 653, mobile device 620 may determine if a stored copy of the font transformation associated with the user is available. In step 654, if mobile device 620 does not have a stored copy if the font transformation, then the receiving mobile device (e.g., mobile device 620) may retrieve user 1 font transformation 624 from the first mobile device (e.g., mobile device 610). Accordingly, in step 655, mobile device 620 stores the font transformation locally at the receiving mobile device (e.g., mobile device 620). In step 656, responsive to message 625 displayed to user 2 620, rasterizer 622 of the receiving mobile device may apply the font transformation to the base font (e.g., base font 101). It should be understood that in another embodiment, the receiving mobile device may be mobile device 610 and the received message may be message 615. Furthermore, the purpose of rasterizer 612 and 622 is to create a font "image" that can be displayed on screen, using a base font and applying a font transformation if a font transformation is provided.

Figure 7A:
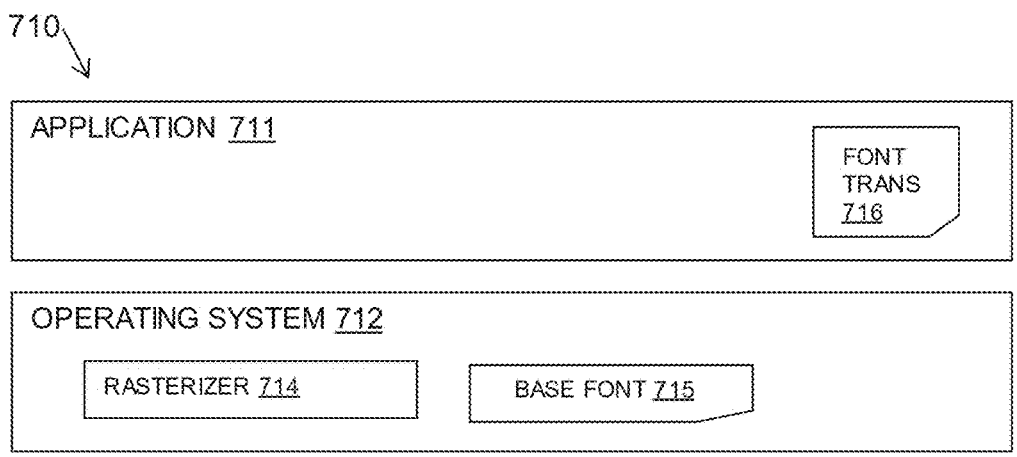
FIGS. 7A-7C are schematic diagrams showing an embodiment of a rasterizer, in accordance an embodiment of the present invention.
Figure 7B:
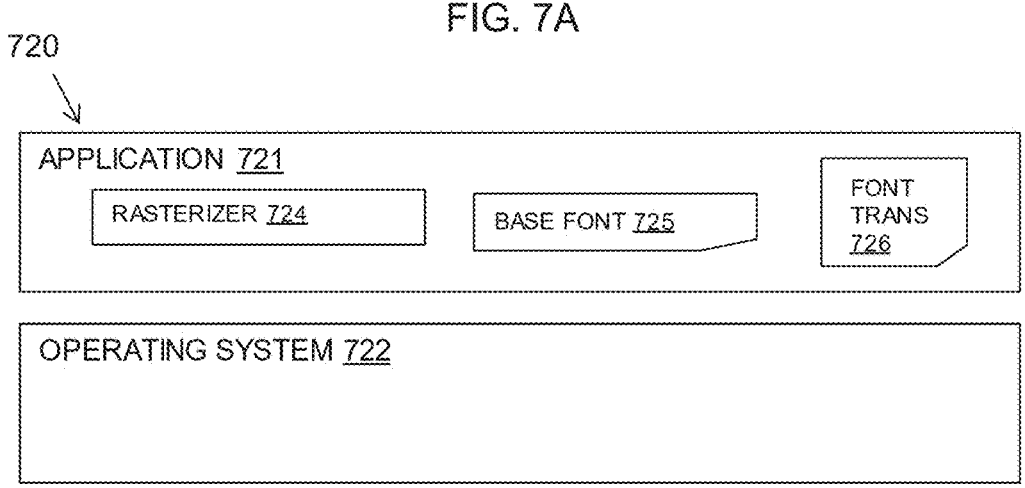
Figure 7C:
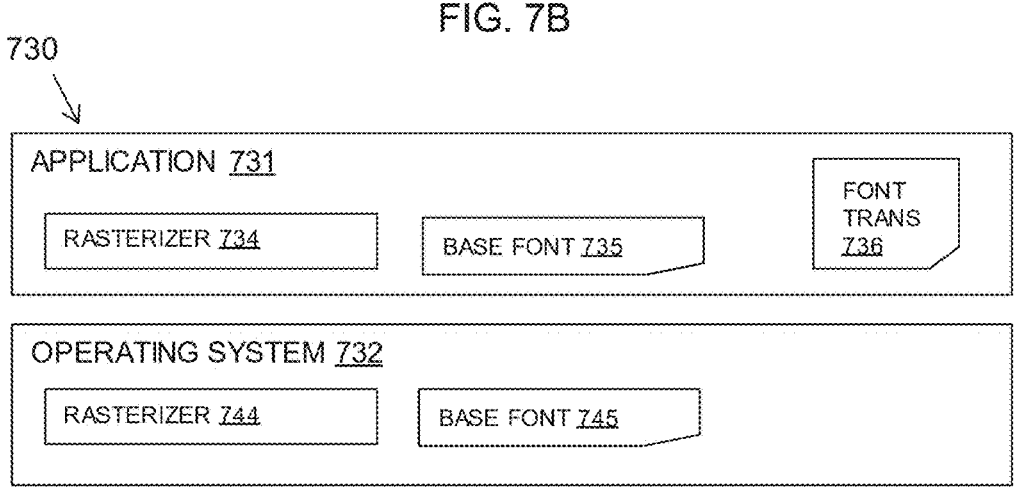

FIGS. 7A-7C are schematic diagrams 710, 720, and 730 showing an embodiment of a rasterizer, in accordance with an embodiment of the present invention. There are a number of options for where the rasterizer (e.g., rasterizer 103), a base font (e.g., base font 101), and a font transformation (e.g., font transformation 102) can be located within the software stack. Schematic diagrams 710, 720, and 730 represent "layers" of the software stack including operating systems 711, 721, and 731, with applications 712, 722, and 732, respectively. In this embodiment, rendering and display services can be implanted in both layers, and combinations of layers.

FIG. 7A shows system 710, where rasterizer 714 and base font 715 are provided in operating system 711 and font transformation 716 is provided in application 712.

FIG. 7B shows system 720, where rasterizer 724, base font 725 and font transformation 726 are all provided in application 722.

FIG. 7C shows system 730, where rasterizer 734, base font 735 and font transformation 736 are provided in application 731 and override rasterizer 744 and base font 745 provided in operating system 732.

In another embodiment, a single font transformation (e.g., font transformation 102) may be used across multiple services. For example, a user (author) may create a social-network account. As part of the customization of the user's social-network account, the user may choose to create a personalized font transformation to be associated with the user's social-network account.

In yet another embodiment, another viewer may connect to the social-network website. In this instance, a font transformation (e.g., font transformation 102) may be applied to content created by the author, as described in the web server embodiment (FIG. 4A). If the viewer installs a social-network mobile application associated with the social-network website, the same font transformation may be downloaded to the viewer's mobile device and applied to the author's content, as described in the instant messaging embodiment (FIG. 5A).

In yet another embodiment, a third party application may use the social-network login-API to authenticate users to a third party site. In this instance, the viewer may connect to a third party site that is authenticated using the social-network login-API. Furthermore, the third party site could use an API provided by the social-network to gain access to the font transformation (e.g., font transformation 102) associated with the author. Any content created by the author on the 3rd party site may then be rendered using the font transformation.

Figure 8:
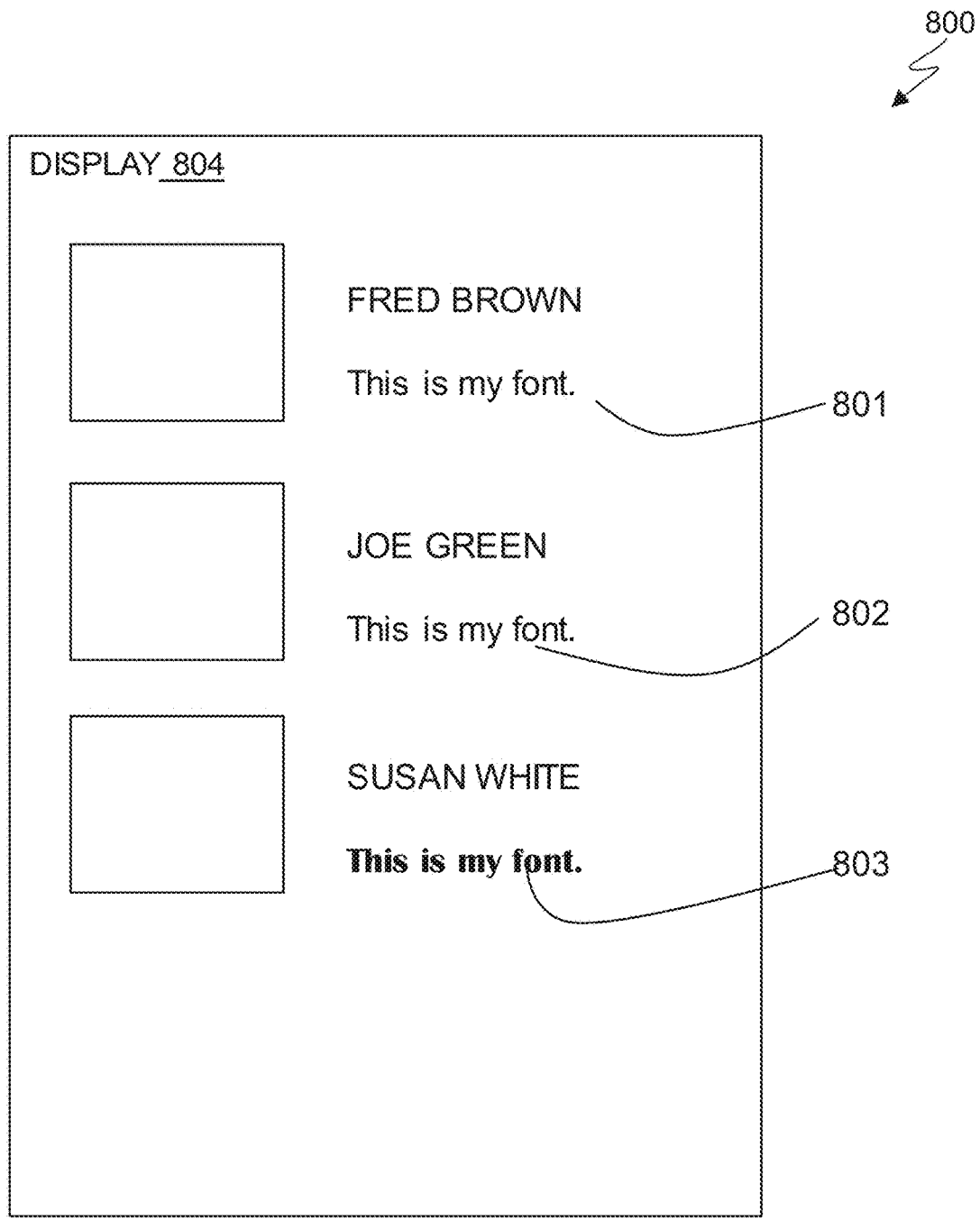
FIG. 8 is an example representation of a display, in accordance an embodiment of the present invention.

FIG. 8 is an example representation of display 804, in accordance with an embodiment of the present invention. Display environment 800 includes display 804 which shows transformed fonts 801, 802, and 803. Other examples of where a font transformation may be used, include: Social media—personal and shared "walls" (i.e., often called timelines); web services displaying personal comments (e.g. reviews on products, forums, etc.); Knowledge center comments; Email threads; Instant messaging, both peer-to-peer and group messaging; Mobile phone SMS messages; Applications (i.e., mobile, desktop, or other device applications) that displays content created by an end user; and Multi-user operating systems can provide the font services to all applications (e.g., when viewing a directory of files filenames can adopt the users transformed font form). Furthermore, file previews can also use font transformations.

If the font transformation (e.g., font transformation 102) is unavailable then the base font (e.g., base font 101) would appear on display 804 as the transform, much like a regular font would appear on display 804. Furthermore, individual character features and subtleties of a personalized font may be recognizable over time, much as handwriting becomes recognizable over time.

Figure 9:
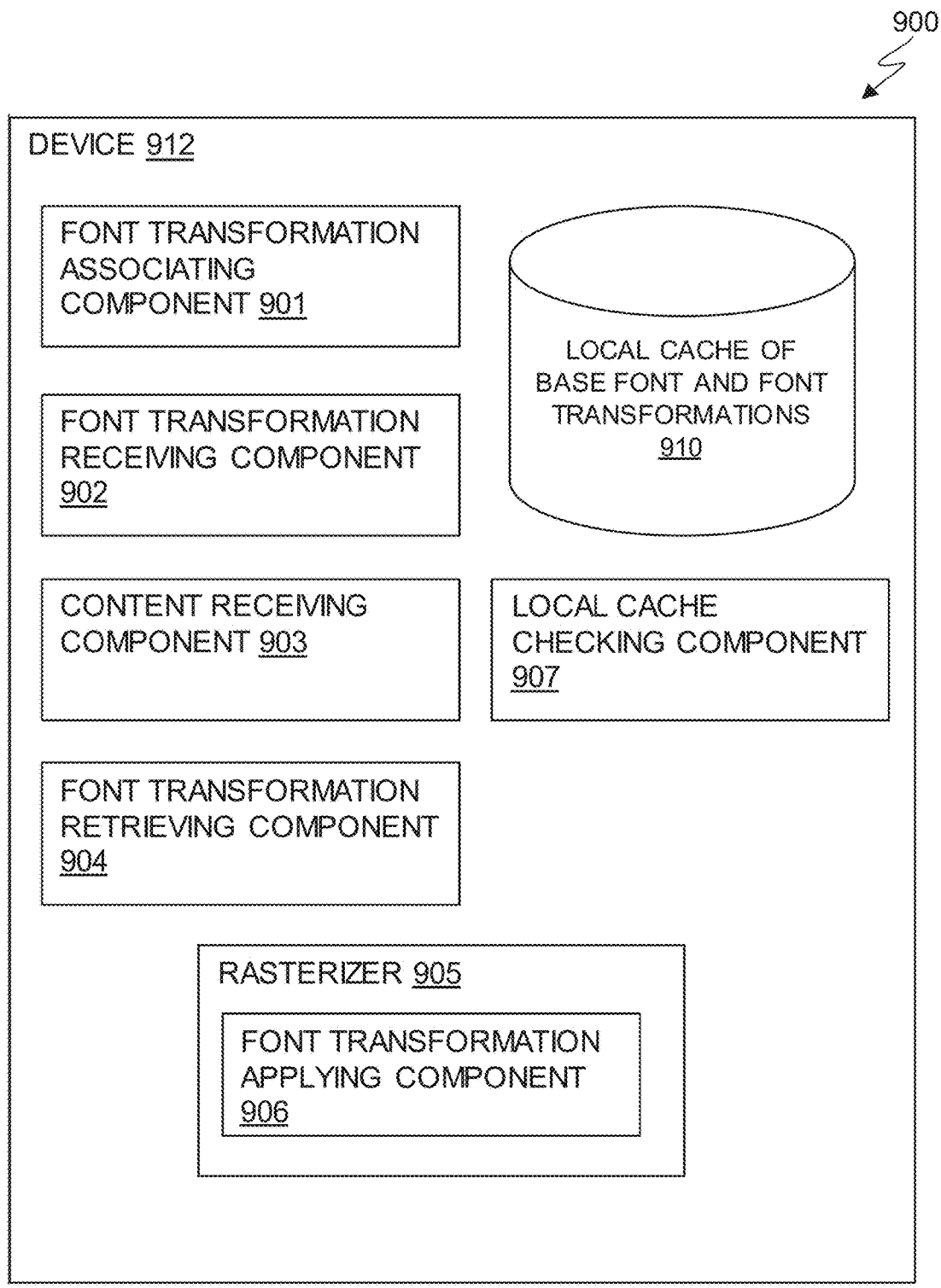
FIG. 9 is a block diagram of an example embodiment of a system, in accordance an embodiment of the present invention.

FIG. 9 is a block diagram of an example embodiment of a device environment 900, in accordance with the present invention. In this embodiment, the block diagram shows device environment 900 providing the described functionality.

Device environment 900 includes device 912 which may contain font transformation receiving component 902 configured to receive the user-specific font transformation (e.g., font transformation 102) at a client. The user-specific font transformation has been defined as font transformation of a base font (e.g., base font 101) by an author user, wherein the user-specific font transformation is associated with the author user. In certain embodiments, device 912 may be configured to be a content providing service. In this instance, font transformation associating component 901 may be provided at device 912.

Content receiving component 903 is configured to receive content associated with the author user (e.g., content provided by or attributed to the author user), including an identifier associated with the user-specific font transformation.

Local cache checking component 907 is configured to determine if a local copy of a user-specific font transformation is available at local cache of base font and font transformations 910. Furthermore, font transformation retrieving component 904 may be provided for retrieving the user-specific font transformation, if the user-specific font transformation is not stored locally.

Rasterizer 905 can include font transformation applying component 906, which is configured to apply the user-specific font transformation (e.g., font transformation 102)

to a base font (e.g., base font 101) when rendering content provided or attributed to the author user.

Figure 10:
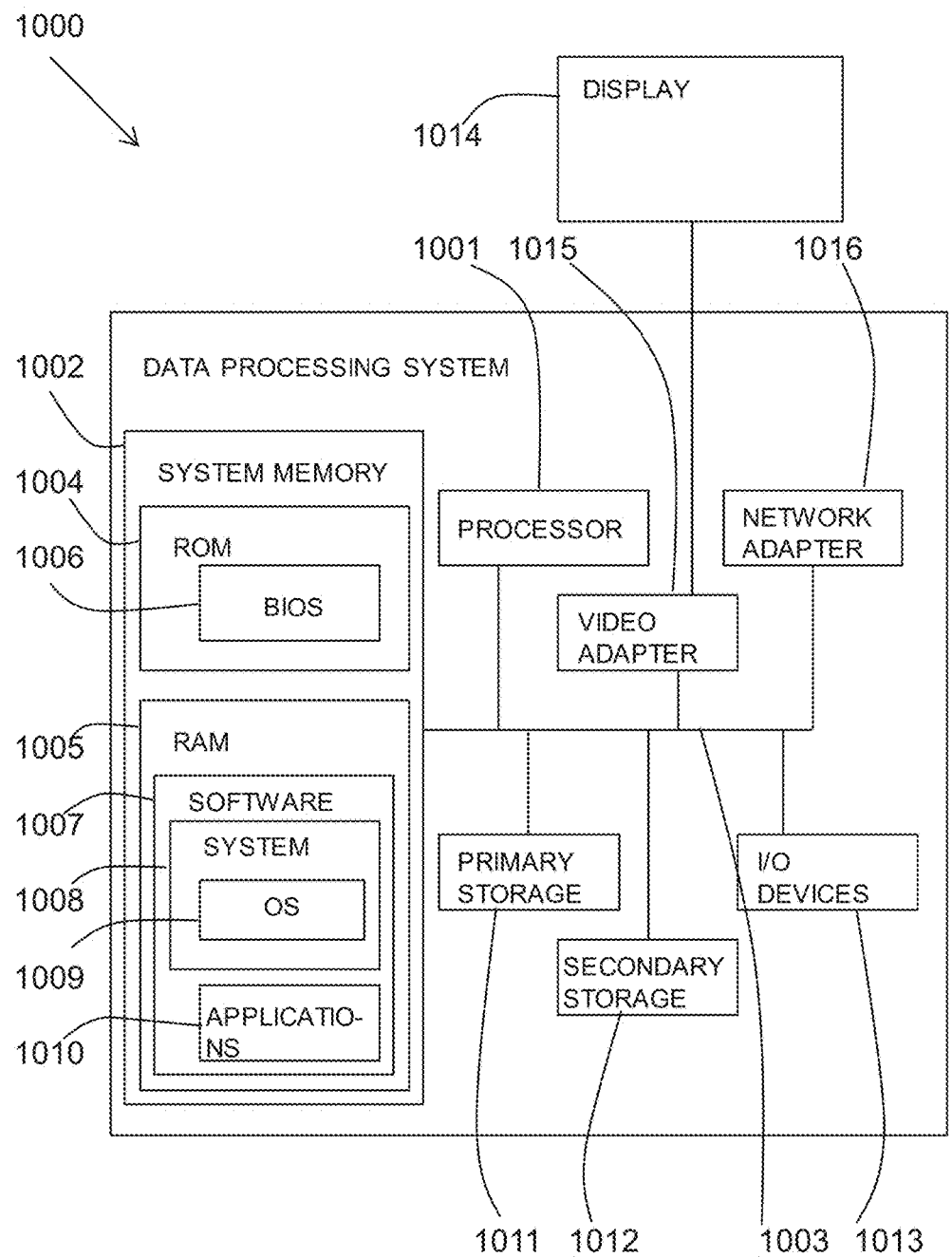
FIG. 10 is a block diagram of an embodiment of a computer system, in accordance an embodiment of the present invention.

FIG. 10 is a block diagram of an embodiment of a computer system 1000, in accordance with an embodiment of the present invention. In this embodiment, computer system 1000 suitable for storing and/or executing program code including at least one processor 1001 coupled directly or indirectly to memory elements through system bus 1003. The memory elements may include: local memory employed during execution of the program code, bulk storage, and cache memories, which provide temporary storage of at least some program code in order to reduce the number of times the program code must be retrieved from bulk storage during execution.

The memory elements may include system memory 1002 in the form of read only memory (ROM) 1004 and random access memory (RAM) 1005. A basic input/output system (BIOS) 1006 may be stored in ROM 1004. Software 1007 may be stored in RAM 1005 including operating system (OS) 1008 such as operating system software 1009. Applications 1010 may also be stored in RAM 1005.

Computer system 1000 may also include primary storage 1011 (e.g., a magnetic hard disk drive) and secondary storage 1012 (e.g., another magnetic disc drive) and an optical disc drive. Primary storage 1011 and secondary storage 1012 and associated computer-readable media provide non-volatile storage of computer-executable instructions, data structures, program modules and other data for computer system 1000. Applications 1010 may be stored on primary storage 1011 and/or secondary storage 1012, as well as system memory 1002.

Computer system 1000 may operate in a networked environment using logical connections to one or more remote computers via network adapter 1016.

Input/output (I/O) devices 1013 may be coupled to computer system 1000 directly or through intervening I/O controllers. A user may enter commands and information into computer system 1000 through I/O devices 1013. For example, I/O devices 1013 may include input devices such as: keyboard, pointing device, or other input devices (e.g., microphone, joy stick, game pad, satellite dish, scanner, etc.). In another example, I/O devices 1013 may include output devices such as: speakers, printers, etc. Display 1014 is also connected to system bus 1003 via an interface, such as video adapter 1015.

Figure 11:
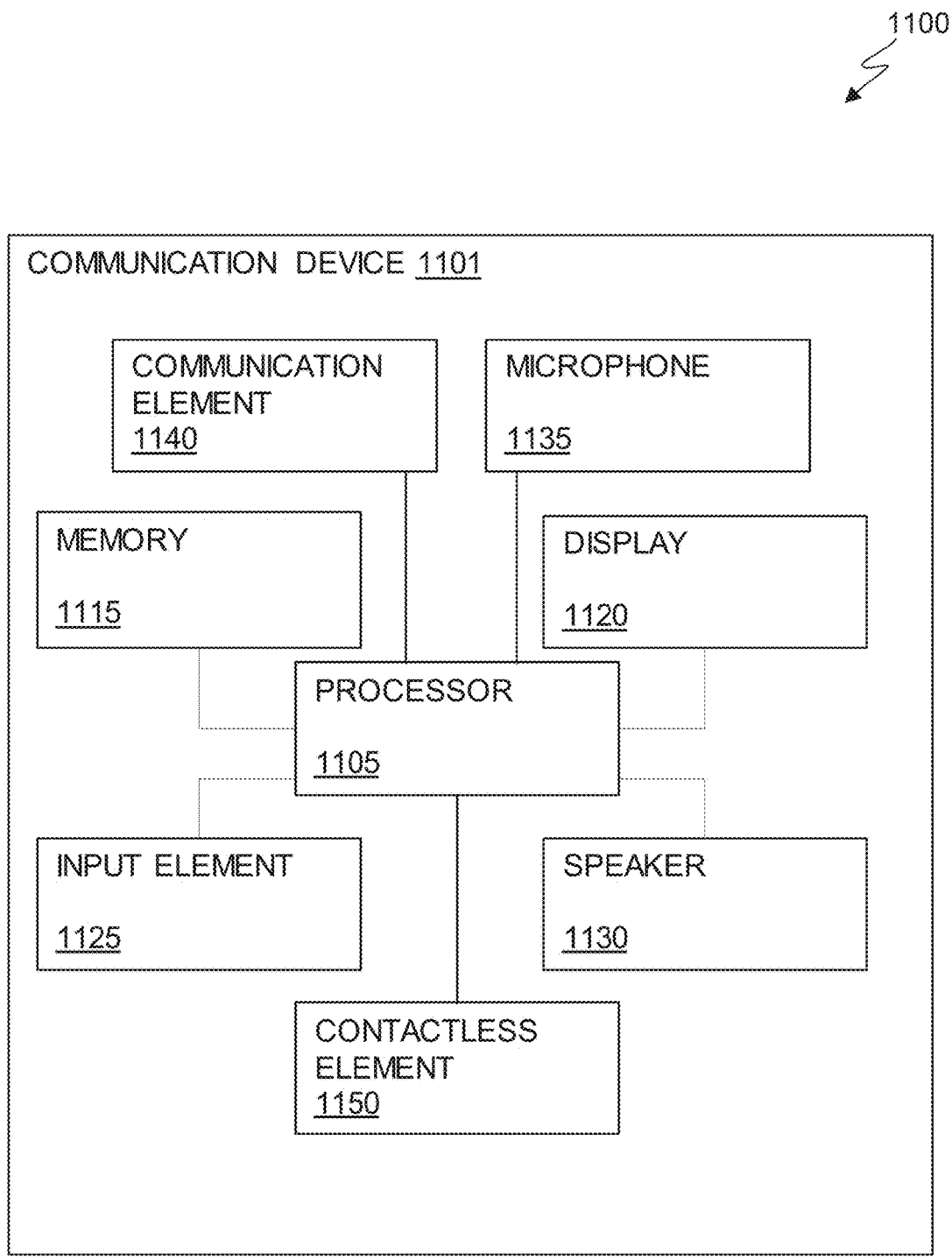
FIG. 11 is a block diagram of an embodiment of a communication device, in accordance an embodiment of the present invention.

FIG. 11 shows a block diagram of a communication device environment 1100, in accordance with an embodiment of the present invention. In certain embodiments, communication device environment 1100 may be similar to mobile communication device environment 600, as previously described with regard to FIGS. 6A and 6B. In this embodiment, communication device environment 1100 includes communication device 1101. In one embodiment, communication device 1101 may be a cell phone, a feature phone, a smart phone, a satellite phone, or a computing device having a phone capability (including a wearable device such as glasses, watches, etc.).

Communication device 1101 may include processor 1105 (e.g., a microprocessor) for processing the functions of communication device 1101 and display 1120 to allow a user to see phone numbers, other information, and messages. Communication device 1101 may also include input element 1125, enabling a user to input information into communication device 1101 (e.g., input buttons, touch screen, etc.), speaker 1130, enabling the user to hear voice communication, music, etc., and microphone 1135, enabling the user to transmit his or her voice through communication device 1101.

Processor 1105 of communication device 1101 may connect to memory 1115. Memory 1115 may be in the form of a computer-readable medium that stores data and, optionally, computer-executable instructions.

Communication device 1101 may also include communication element 1140 for connection to a plurality of communication channels (e.g., a cellular telephone network, data transmission network, Wi-Fi network, satellite-phone network, Internet network, Satellite Internet Network, etc.). Communication element 1140 may include an associated wireless transfer element (e.g., an antenna).

Communication element 1140 may include a subscriber identity module (SIM) in the form of an integrated circuit that stores an international mobile subscriber identity and a related key used to identify and authenticate a subscriber using communication device 1101. One or more subscriber identity modules may be removable from communication device 1101 or embedded in communication device 1101.

Communication device 1101 may further include contactless element 1150, typically implemented in the form of a semiconductor chip (or other data storage element) with an associated wireless transfer element (e.g., an antenna). Contactless element 1150 may be associated with (i.e., embedded within) communication device 1101 and data or control instructions transmitted via a cellular network may be applied to contactless element 1150 by means of a contactless element interface (not shown). The contactless element interface is configured such that the exchange of data and/or control instructions between mobile device circuitry (and hence the cellular network) and contactless element 1150.

Contactless element 1150 may be capable of transferring and receiving data using a near field communication (NFC) capability (or near field communication medium) typically in accordance with a standardized protocol or data transfer mechanism (e.g., ISO 14443/NFC). NFC capability is a short-range communications capability, such as radio-frequency identification (RFID), Bluetooth, infrared, or other data transfer capability that can be used to exchange data between communication device 1101 and an interrogation device. Thus, communication device 1101 may be capable of communicating and transferring data and/or control instructions via both a cellular network and near field communications capability.

Data stored in memory 1115 may include: operation data relating to the operation of communication device 1101, personal data (e.g., name, date of birth, identification number, etc.), financial data (e.g., bank account information, a bank identification number (BIN), credit or debit card number information, account balance information, expiration date, loyalty provider account numbers, etc.), transit information (e.g., as in a subway or train pass), access information (e.g., as in access badges), etc. A user may transmit this data from communication device 1101 to selected receivers.

Communication device 1101 may be, amongst other things, a notification device that can receive alert messages and access reports, a portable merchant device that can be used to transmit control data identifying a discount to be applied, as well as a portable consumer device that can be used to make payments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for font personalization, comprising:
   receiving, by one or more computer processors, a unique user-specific font transformation at a first client for storing at the first client, wherein the unique user-specific font transformation is associated with a user profile and comprises one or more discrete files containing one or more instructions for transforming a base font for an author user;
   receiving, by one or more computer processors, content associated with the author user, wherein the content associated with the author user is received with an identifier of the unique user-specific font transformation of the author user;
   receiving, by one or more computer processors, the base font at the first client for storing at the first client for use with the unique user-specific font transformation; and
   applying, by one or more computer processors, the unique user-specific font transformation to the base font when rendering the content associated with the author user, wherein the unique user-specific font transformation applies an instruction for transforming a base font to a plurality of characters of the base font, wherein the plurality of characters share one or more common traits, and wherein the transformed base font captures a personal style as selected by a user.

2. The method as claimed in claim 1, further comprising:
   determining, by one or more computer processors, whether a local copy of the user-specific font transformation is available;
   responsive to determining that the local copy of the user specific font transformation is available, receiving, by one or more computer processors, the local copy of the user-specific font transformation; and
   responsive to determining that the local copy of the user specific font transformation is not available, requesting, by one or more computer processors, the user-specific font transformation from a remote source.

3. The method as claimed in claim 1, further comprising:
   determining, by one or more computer processors, whether a local copy of a required base font is available;
   responsive to determining that the local copy of the required base font is available, receiving, by one or more computer processors, the local copy of the required base font; and
   responsive to determining that the local copy of the required base font is not available, requesting, by one or more computer processors, the required base font from a remote source.

4. The method of claim 1, further comprising:
   receiving, by one or more computer processors, a plurality of user-specific font transformations for a plurality of author users at the first client; and
   storing, by one or more computer processors, the plurality of user-specific font transformations for the plurality of author users at the first client, wherein each of the plurality of user-specific font transformations is associated with an author user of the plurality of the author users.

5. The method as claimed in claim 1, wherein the font transformation of the base font includes at least one of: an equation modification to an equation of a vector font, a matrix transformation to a bitmap font, or a defined language transformation.

6. The method as claimed in claim 1, wherein the first client has a web browser in communication with a server, and wherein the user-specific font transformation and the content associated with the author user are received from the server.

7. The method as claimed in claim 1, wherein the first client is in communication with a second client via a server, wherein the user-specific font transformation is received by the server, and wherein the content associated with the author user is received from the second client.

8. The method as claimed in claim 1, wherein the first client is in communication with a second client, and wherein the user-specific font transformation and the content associated with the author user are received from the second client.

9. A system for font personalization having one or more computer processors and one or more computer readable storage media, the system comprising:
   one or more processors, one or more computer-readable memories, one or more computer-readable non-transitory tangible storage medium, and program instructions stored on at least one of the one or more tangible storage medium for execution by at least one of the one or more processors via at least one of the one or more memories, wherein the computer system is capable of performing a method comprising:
      receiving a unique user-specific font transformation at a first client for storing at the first client, wherein the unique user-specific font transformation is associated with a user profile and comprises one or more discrete files containing one or more instructions for transforming a base font for an author user;
      receiving content associated with the author user, wherein the content associated with the author user is received with an identifier of the unique user-specific font transformation of the author user;
      receiving the base font at the first client for storing at the first client for use with the unique user-specific font transformation; and
      applying the unique user-specific font transformation to the base font when rendering the content associated with the author user, wherein the unique user-specific font transformation applies an instruction for transforming a base font to a plurality of characters of the base font, wherein the plurality of characters share one or more common traits, and wherein the transformed base font captures a personal style as selected by a user.

10. The system as claimed in claim 9, further comprising:
    a local cache checking component configured to:
    determine whether a local copy of the user-specific font transformation is available;
    responsive to determining that the local copy of the user specific font transformation is available, receive the local copy of the user-specific font transformation; and
    responsive to determining that the local copy of the user specific font transformation is not available, request the user-specific font transformation from a remote source.

11. The system as claimed in claim 9, further comprising:
    a base font receiving component configured to:
    determine whether a local copy of a required base font is available;

responsive to determining that the local copy of the required base font is available, receive the local copy of the required base font; and responsive to determining that the local copy of the required base font is not available, request the required base font from a remote source.

12. The system as claimed in claim 9, wherein the first client has a web browser in communication with a server, wherein the font transformation receiving component is configured to receive the user-specific font transformation and the content receiving component is configured to receive the content associated with the author user from the server.

13. The system as claimed in claim 9, wherein the first client is in communication with a second client via a server, wherein the font transformation receiving component is configured to receive the user-specific font transformation from the server, and wherein the content receiving component is configured to receive the content associated with the author user from the second client.

14. The system as claimed in claim 9, wherein the first client is in communication with a second client, wherein the font transformation receiving component is configured to receive the user-specific font transformation and the content receiving component is configured to receive the content associated with the author user from the second client.

15. A computer program product for font personalization, the computer program product comprising:

one or more non-transitory computer readable storage media and program instructions stored on the one or more computer readable storage media, the program instructions comprising:

program instructions to receive a unique user-specific font transformation, wherein the user specific font transformation is associated with a user profile and comprises one or more discrete files containing one or more instructions for transforming a base font for an author user;

program instructions to receive content associated with the author user, wherein the content associated with the author user is received with an identifier of the unique user-specific font transformation of the author user;

program instructions to receive the base font at the first client for storing at the first client for use with the unique user-specific font transformation; and program instructions to apply the unique user-specific font transformation to the base font when rendering the content associated with the author user, wherein the unique user-specific font transformation applies an instruction for transforming a base font to a plurality of characters of the base font, wherein the plurality of characters share one or more common traits, and wherein the transformed base font captures a personal style as selected by a user.

16. The computer program product of claim 15, wherein the program instructions stored on the one or more non-transitory computer readable storage media further comprise:

program instructions to determine whether a local copy of the user-specific font transformation is available;

program instructions to, responsive to determining that the local copy of the user specific font transformation is available, receive the local copy of the user-specific font transformation; and program instructions to, responsive to determining that the local copy of the user specific font transformation is not available, request the user-specific font transformation from a remote source.

\* \* \* \* \*